(12) United States Patent
Hagen et al.

(10) Patent No.: US 11,239,732 B2
(45) Date of Patent: Feb. 1, 2022

(54) FIXED GAP CAPACITIVE POWER TRANSFER COUPLING FOR WOUND FIELD SYNCHRONOUS MACHINES

(71) Applicant: Wisconsin Alumni Research Foundation, Madison, WI (US)

(72) Inventors: Skyler S. Hagen, Markesan, WI (US); Daniel Colin Ludois, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 260 days.

(21) Appl. No.: 16/534,735

(22) Filed: Aug. 7, 2019

(65) Prior Publication Data

US 2021/0044182 A1   Feb. 11, 2021

(51) Int. Cl.
*H02K 13/00* (2006.01)
*H01R 39/02* (2006.01)
*H02K 13/14* (2006.01)

(52) U.S. Cl.
CPC ............ *H02K 13/003* (2013.01); *H01R 39/02* (2013.01); *H02K 13/14* (2013.01)

(58) Field of Classification Search
CPC ...... H02K 13/003; H02K 13/14; H02K 19/10; H02K 11/0094; H02K 13/00; H02K 11/21; H02K 19/12; H02K 19/26; H01R 39/02; Y02E 10/72; Y02T 10/64; Y02T 90/16; B60L 2220/14
USPC .......................................... 310/219, 72, 68 D
See application file for complete search history.

(56) References Cited

U.S. PATENT DOCUMENTS

| | | | |
|---|---|---|---|
| 8,736,137 B2 * | 5/2014 | Ludois ................... | H02K 19/12 310/219 |
| 9,692,279 B2 | 6/2017 | Ludois et al. | |
| 2016/0099663 A1 * | 4/2016 | Petrowsky ............. | H02N 1/004 310/300 |

* cited by examiner

*Primary Examiner* — Ahmed Elnakib
(74) *Attorney, Agent, or Firm* — Boyle Fredrickson, S.C.

(57) ABSTRACT

An electrical rotating machine, such as a generator or motor, communicates power from a stationary location to the rotating rotor of the rotating machine via opposed pairs of capacitor plates, one plate of each pair rotating with the rotor and one plate of each pair fixed not to rotate. Larger plate gaps suitable for mechanically rigid plates are possible through high-voltage and high-frequency AC signals managed by using a dielectric support design for the capacitor plates minimizing dielectric loss and/or impedance matching on the rotor.

18 Claims, 6 Drawing Sheets

FIXED GAP CAPACITIVE POWER TRANSFER COUPLING FOR WOUND FIELD SYNCHRONOUS MACHINES

STATEMENT REGARDING FEDERALLY SPONSORED RESEARCH OR DEVELOPMENT

This invention was made with government support under DE-EE0007798 awarded by the US Department of Energy. The government has certain rights in the invention.

CROSS REFERENCE TO RELATED APPLICATION

N/A

BACKGROUND OF THE INVENTION

The present invention relates to wound field synchronous machines (e.g., electrical motors and generators) and in particular to a wound field synchronous machine using capacitive coupling to transfer electrical power to the rotor.

Electrical motors and generators share similar structures of a magnetically interacting stator and rotor and may be collectively termed "electrical rotating machines." Electrical rotating machines employing permanent magnets for the rotor are termed permanent magnet synchronous machines (PMSM) and are popular in high-volume traction applications (e.g., motor drives for hybrid vehicles) and for compact electrical generation (e.g., generators used in wind turbines) because of their high torque density and efficiency.

The permanent magnets in PMSMs typically use rare earth materials of a volatile supply chain and whose extraction and refinement may inflict detrimental effects on the environment. For this reason, wound field synchronous machines (WFSM), using an electrical coil in place of the permanent magnet on the rotor, have received renewed attention. WFSMs have equal to or lower torque density in comparison to PMSMs but, by permitting control of the rotor field directly, allow more sophisticated motor control, for example, permitting a high-power factor throughout the machine operating range of different operating speeds and torques. The ability to control the rotor field also permits improved handling of faults by allowing back EMF to be controlled (by removing the field current).

A significant disadvantage to WFSMs is the difficulty of coupling significant electrical power to a rotating rotor coil. Such coupling may be done by using electrical "slip rings" in which brushes, typically a carbon composite material, mechanically slide on continuous or semi-continuous metal rings. This mechanical approach is subject to problems of wear on the brushes and rings and the problem of generating debris from such, which may contaminate the environment of the motor.

An alternative approach to mechanical electrical coupling is the transfer of electrical energy by mutual inductance between coils of a rotary transformer. In such a transformer, a stationary primary coil may communicate, via magnetic fields, with a secondary coil mounted to rotate with the rotor. The conductive coils of a rotary transformer and the ferromagnetic components normally used to concentrate the magnetic flux may substantially increase the weight and cost of the motor.

Fixed-gap capacitive coupling is known for low-power electrical data transfer, for example, for transferring digital data from a rotating device. The use of fixed-gap capacitive coupling in motor applications, for example, by using adjacent rotating and stationary capacitor plates, is hampered by relatively small capacitance that can be obtained with practical tolerances and the need for significantly greater amounts of power for practical motor operation.

U.S. Pat. Nos. 8,736,137 and 9,692,279, assigned to the assignee of the present invention and hereby incorporated by reference, disclose a capacitive coupling system that allows sufficient power transfer for operation of a wound field synchronous machines. This capacitive coupling system uses capacitor plates separated on a thin cushion of air on which one movable capacitor plate floats in the manner of a gas bearing. By reducing the separation between the capacitor plates to small values associated with air bearings, higher capacitance values are obtained.

SUMMARY OF THE INVENTION

The present invention provides a wound field synchronous machine in which power is transferred to the rotor across a larger distance than is conducive to fixed-gap capacitive coupling. This increased capacitor plate separation uses higher voltages and frequencies, an approach made possible by the inventors' identification and reduction of dielectric losses occurring in dielectric materials at these frequencies and voltages. The use of higher voltages with low-impedance rotor windings is enabled with an onboard rotating impedance matching circuit.

Specifically, in one embodiment, the invention provides an electrical rotating machine having a rotor mounted for rotation about an axis and including at least one electrical coil having a coil axis with a component perpendicular to the axis, the electrical coil comprising a conductor having first and second conductor ends. At least a first and second capacitor plate are attached to rotate with the rotor in electrical communication with the electrical coil and at least a third and fourth capacitor plate are mounted to a frame so as not to rotate with the rotor. The plates are arranged to provide capacitive coupling to transfer power between the electrical coil and an external source of power at a range of angular positions of the rotor about the axis. The first and second capacitor plates are nonoverlapping in directions parallel to the axis and supported by an insulating dielectric extending perpendicularly to the axis, and the insulating dielectric includes axial through slots separating the first and second capacitor plates.

It is thus a feature of at least one embodiment of the invention to provide a larger gap capacitive coupling system for high power transfer, the larger gap permitting simple and robust mechanical implementation with fixed-gap capacitor plates.

The first and second capacitor plates may follow concentric circular paths on the dielectric and the slots may be arcuate slots between the first and second capacitor plates separated by supporting struts.

It is thus a feature of at least one embodiment of the invention to permit capacitive coupling for multiple phase connections.

The physical area of the capacitor plate having an outer circular path may be smaller than the physical area of the capacitor plate on an inner circular path inside the outer circular path.

It is thus a feature of at least one embodiment of the invention to provide balanced multiphase capacitive coupling by compensating for the effect of fringe fields around the plate areas.

The insulating dielectric may support power processing circuitry at a central region radially within the first and second capacitor plates and may include a radially extending conductor passing from an outermost capacitor plate to the central region within a gap in the innermost conductor plate.

It is thus a feature of at least one embodiment of the invention to favorably locate processing circuitry at areas of low accelerative force using a connection to the outer plate passing through the inner plate with manageable dielectric losses.

The power processing circuitry may include rectification circuitry.

It is thus a feature of at least one embodiment of the invention to provide a rotor-based source of DC power usable for a variety of purposes and different types of machines.

The electrical rotating machine may further include an impedance matching circuit attached to rotate with the rotor and electrically communicating with the electrical coil, the impedance matching circuit positioned in the circuit through the first and second capacitor plates and the electrical coil and operating to reduce voltage and increase current applied to the electrical coil from that applied at the first and second capacitor plates.

It is thus a feature of at least one embodiment of the invention to permit high-voltage operation for efficient power transfer while accommodating low-impedance windings desired to permit large gauge conductors that can resist mechanical stress and resistive losses.

The impedance matching circuit may be a buck converter.

It is thus a feature of at least one embodiment of the invention to provide impedance matching without bulky and costly transformers that can be impractical at high power levels and frequencies.

The buck converter may provide a switching of current through the electrical coil at a predetermined frequency of less than 1 MHz and less than 90% duty cycle ratio.

It is thus a feature of at least one embodiment of the invention to minimize the circuit demands and power consumption of the buck converter.

The buck converter may have active circuitry powered by electrical power received through the capacitor plates.

It is thus a feature of at least one embodiment of the invention to power the buck converter using scavenged power.

The insulating dielectric material may provide a front and rear face opposed along the axis and have metallic cladding covering more than 50% of the area of each face.

It is thus a feature of at least one embodiment of the invention to provide a balanced construction to the first and second capacitor plate assembly to prevent warpage with temperature changes permitting closer mechanical tolerances.

The third and fourth capacitor plates may also be nonoverlapping in directions parallel to the axis and supported by an insulating dielectric extending perpendicularly to the axis wherein the insulating dielectric includes axial through slots separating the third and fourth capacitor plates, and the third and fourth capacitor plates may follow concentric circular paths on the dielectric, and the slots may be arcuate slots between the first and second capacitor plates separated by supporting struts It is thus a feature of at least one embodiment of the invention to provide matching stator plate supports for efficient capacitive transfer to the rotor.

These particular features and advantages may apply to only some embodiments falling within the claims and thus do not define the scope of the invention.

DETAILED DESCRIPTION OF THE PREFERRED EMBODIMENT

Figures 1, 2:
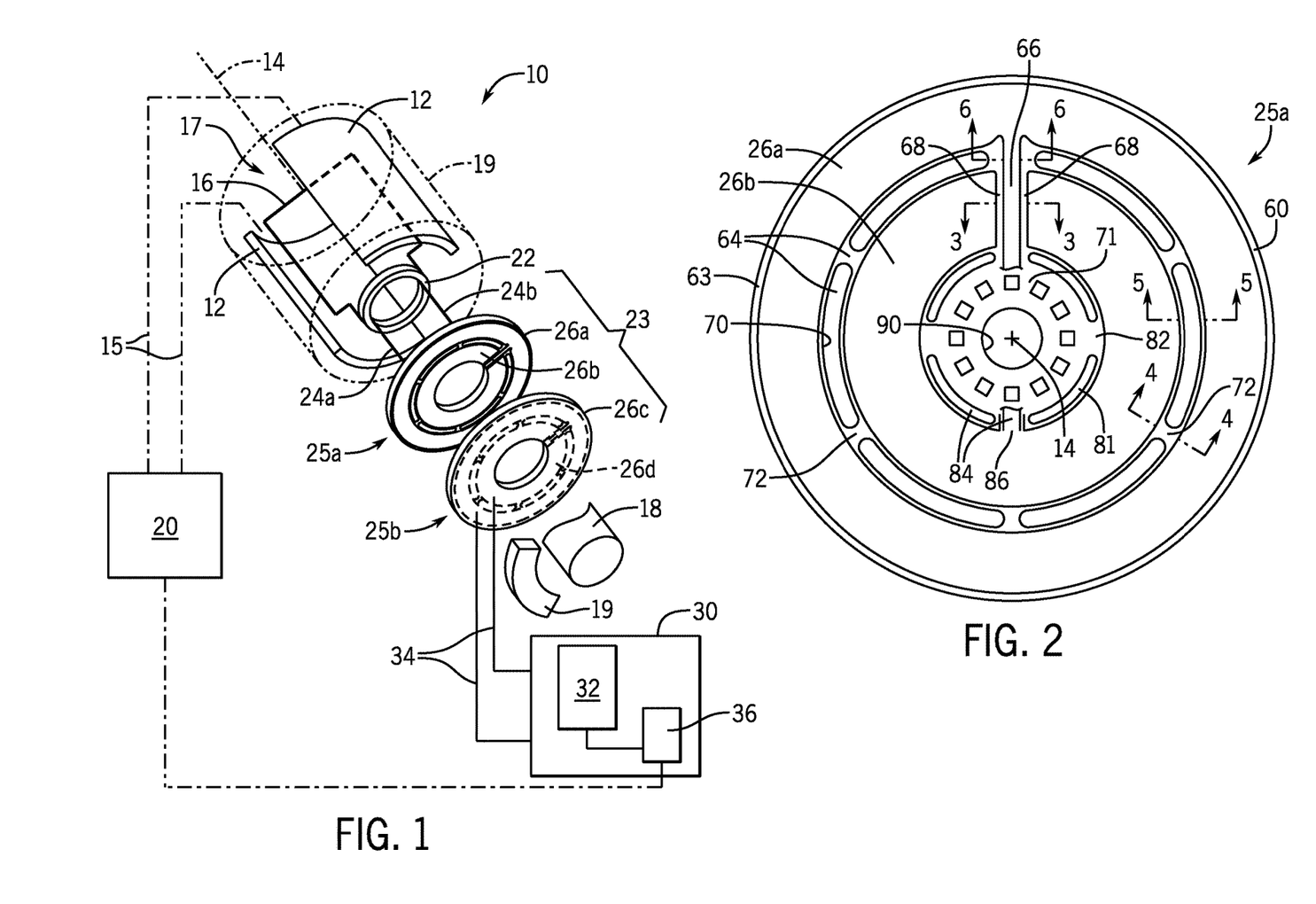
FIG. 1 is a simplified diagram of a fixed-gap wound-field electrical machine to the present invention providing a wound field rotor coil attached via capacitive coupling disks to drive electronics for providing high-frequency AC power.
FIG. 2 is front elevational view of a capacitive coupling disk attached to the rotor showing an inner and outer annular capacitor ring for conducting two separate electrical phases and showing slots between the annular capacitor rings and between the inner capacitor ring and on-board circuitry for reducing dielectric losses and depicting a radial conductor allowing the drive electronics at the center of the disk to communicate with both the inner and outer capacitor ring.

Referring now to FIG. 1, a wound field synchronous machine 10 configured as a motor may include stationary stator windings 12 opposed across a motor axis 14 and generating a rotating magnetic field crossing the motor axis 14.

A rotor 17 is positioned between the stator windings 12 and provides a rotor coil 16 wound about an axis that rotates generally perpendicularly to the axis 14. For clarity, only a single "turn" of the rotor coil 16 is shown; however, it will be understood that typically the rotor coil 16 will comprise many turns of a conductor such as copper wire formed in one or more loops. Also only a single rotor pole pair is shown, and multiple rotor poles may be used. Generally, the rotor coil 16 will be supported on additional structure of the rotor 17 which may be either non-ferromagnetic or ferromagnetic to concentrate the magnetic flux generated by the rotor coil 16.

The rotor 17 may turn about the axis 14 as attached to a shaft 18 supported for rotation about axis 14 on bearings (not shown) supported by a motor housing 19 shown in fragment.

Electric current may be provided to the rotor coil through a capacitive coupling unit 23 as will be described in more detail below. The current through the rotor coil 16 will generate a magnetic field according to principles well known in the art, the magnetic field directed generally perpendicularly to the motor axis 14 and rotating with rotation of the rotor coil 16.

As is generally understood in the art, the stator windings 12 may be energized by a stator winding control unit 20 which controls the amplitudes of stator polyphase currents 15 and thus the direction of the field extending between stator windings 12 to promote an angular torque on the rotor coil 16 causing rotation of the rotor 17 and the shaft 18. The switching of current through the stator windings 12 to create this torque may be done "open loop" without knowledge of the state of the rotor 17, or by means of position or velocity feedback in which the state of the rotor 17 is monitored as a feedback signal using a position or velocity sensor such as an encoder or resolver of conventional design (not shown) or a position sensing technique of the present invention to be described below.

Generally, the conductors of the rotor coil 16 may attach to a rotor power processing circuitry 22 which provides a current to the rotor coil 16 from AC current lines 24a and 24b providing inputs to the rotor power processing circuitry 22. The rotor power processing circuitry 22 may be, for example, a full-wave rectifier employing solid-state diodes of conventional design and may be mounted to rotate with the rotor coil 16 on the shaft 18 which may include impedance matching circuitry as will be discussed below.

Each of AC current lines 24a and 24b may in turn receive power from the capacitive coupling unit 23 where they are connected to a first coupler capacitor disk 25a being part of the capacitive coupling unit 23. The front side of the first coupler capacitor disk 25a supports two annular capacitor plates 26 including annular capacitor plate 26a closest to the periphery of the first coupler capacitor disk 25a and annular capacitor plate 26b concentrically within annular capacitor plate 26a on the first coupler capacitor disk 25a. As will be discussed below, the reverse side of the first coupler capacitor disk 25a (not shown in FIG. 1) will provide corresponding plates 26 in the mirror image of the front side. The coupler capacitor disk 25a is physically attached to the rotor 17 to rotate therewith about motor axis 14.

A second coupler capacitor disk 25b of the capacitive coupling unit 23 is generally stationary with respect to the stator windings 12, for example, attached to a housing 19 supporting the bearings holding the shaft 18 for rotation. The rear side of the second coupler capacitor disk 25b facing the first capacitor disk 25a supports two annular capacitor plates 26 including annular capacitor plate 26c (corresponding in area and disk location with capacitor plate 26a and axially aligned with capacitor plate 26a) and annular capacitor plate 26d (corresponding in area and disk location with capacitor plate 26b and axially aligned with capacitor plate 26b). Again, the reverse or front side of the second coupler capacitor disk 25b will provide corresponding plates 26 (not shown in FIG. 1) in the mirror image of the rear side of the second coupler capacitor disk 25b.

Figure 7:
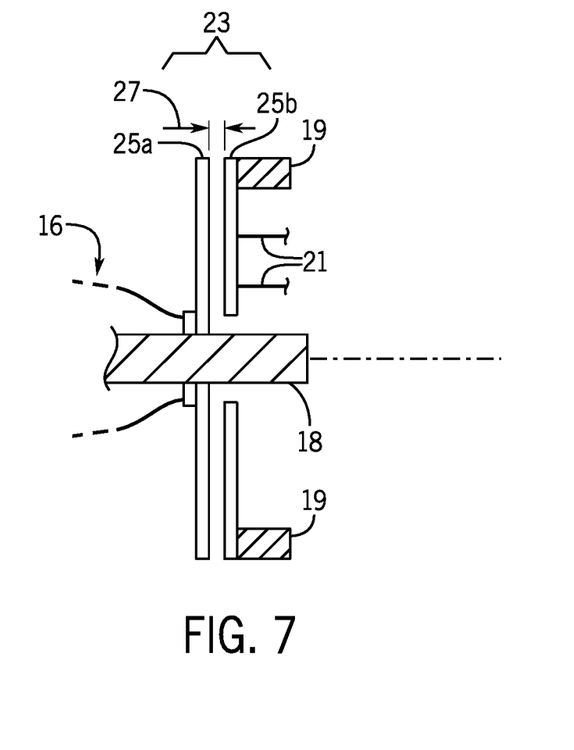
FIG. 7 is a side view of the capacitive coupling disks showing alternative access wiring for a stationary plate eliminating the radial conductor and the gap between the plates during operation.

Referring momentarily to FIG. 7, as noted, the first coupler capacitor disk 25a is attached to shaft 18 to rotate therewith and extends radially in a direction perpendicular to axis 14. The second coupler capacitor disk 25b does not connect to the shaft 18 but rather to a stationary housing or frame 19 so as not to rotate with shaft 18 but also extends radially in a direction perpendicular to axis 14, parallel to first coupler capacitor disk 25a with a separation distance 27 from the first coupler capacitor disk 25a as much as 5 mm but typically 1 mm and desirably more than $\frac{1}{10}$ of a millimeter. Generally this separation distance 27 is mechanically fixed.

Referring again to FIG. 1, capacitor plates 26c and 26d are attached in turn to drive electronics 30 providing AC power to the capacitor plates 26c and 26d. Generally, as will be described in more detail below, the drive electronics 30 may include a solid-state inverter 32 for generating the AC signals on lines 34 at a controllable frequency from a DC source. The drive electronics 30 may be associated with monitoring circuitry 36 which may monitor the drive electronics 30 and/or the AC signal on lines 34 to deduce motor parameters such as velocity and rotor position, as will be described below.

Figure 3:
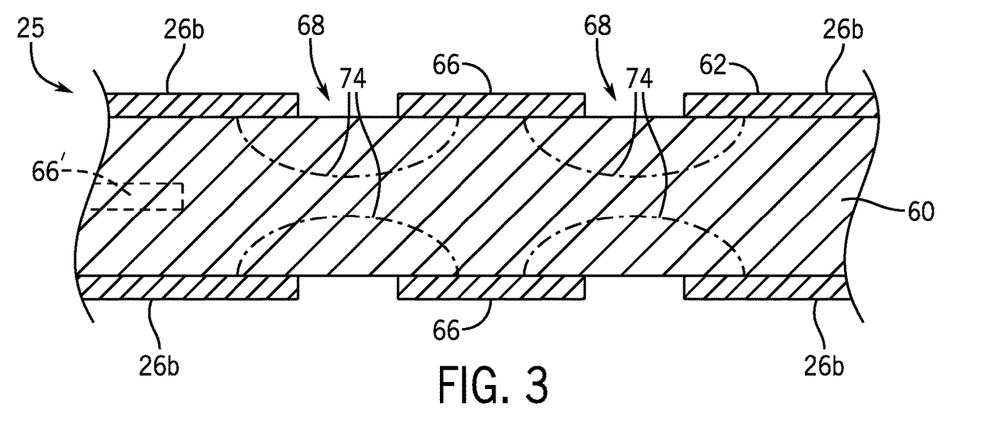
FIG. 3 is a cross-section taken along line 3-3 of FIG. 2 showing regions of high field strength that are reduced by nonoverlapping construction of the radial conductor and the inner and outer capacitor rings resulting in a corresponding reduction in dielectric loss.

Referring now to FIGS. 2 and 3, the first coupler capacitor disk 25a may be constructed of a rigid dielectric material 60 clad with a metal 62 such as copper, the latter typically in a thickness from 0.7 mils to 2.8 mils that may be chemically etched according to standard integrated circuit fabrication processes. The dielectric material 60 may, for example, be an FR4 material having a dielectric constant $e_r$ of 4.4 or may be a material such as RO4000 (also known as Rogers material commercially available from the Rogers Corporation of Chandler Ariz.) having a dielectric constant $e_r$ of 3.38. These materials are composites of glass fiber and other materials including polymers and in some cases ceramics. Desirably the dielectric constant (relative permittivity) of this the dielectric material 60 will be less than five to reduce dielectric losses. The dielectric material 60 may have an axial thickness of $\frac{1}{32}$ inch to $\frac{1}{4}$ inch although other thicknesses are contemplated.

The outer capacitor plate 26a may be a substantially continuous ring of metal on opposite faces of dielectric material 60 inset by a slight margin 63 from the periphery of the capacitor disks 25 to assist in machining of the capacitor disks 25 into a circular shape. The outer capacitor plate 26a is separated from the inner capacitor plate 26b by a gutter region 64 free of metallic conductors with the exception of a single inwardly radially extending conductor bus 66 passing from the outer capacitor plate 26a through flanking gaps 68 in the inner capacitor plate 26b to a central circuit region 71 concentrically inside of the inner capacitor plate 26b holding the rotor power processing circuitry 22. The gutter region 64 is not only free of the copper cladding of metal 62, such as separates capacitor plates 26a and 26b, but includes arcuate slots 70 cutting fully through the dielectric material 60 to remove the dielectric material completely in the region of the slots 70. In order to provide mechanical support for the capacitor plate 26a and its underlying dielectric material 60, the slots 70 are arcuately spaced apart by narrow, radially extending struts 72 within the gutter regions 64 where the dielectric material 60 is not removed but is nevertheless free from metal 62. Generally, the slots 70 will extend over an arc length that is at least live and preferably more than 10 times the arc length of the struts 72 to minimize dielectric material 60 between the capacitor plates 26a and 26b.

Figure 4:
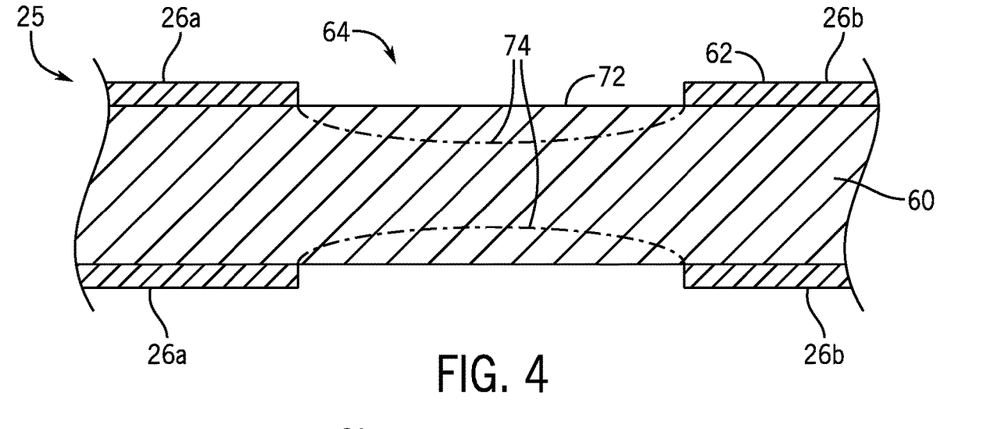
FIG. 4 is a cross-section taken along line 4-4 of FIG. 2 showing regions of high field strength at supporting struts between the inner and outer rings minimized by the relatively small area of the supporting struts.

Referring now to FIG. 4, the gutter region 64 at the struts 72 will experience regions of high electrical field 74 between the capacitor plates 26a and 26b on the front and rear surface of the capacitor disk 25a. These regions of high electrical field 74 pass into the dielectric material 60 causing dielectric loss in the dielectric material 60 increasing losses in power transfer through the capacitive coupling unit 23. The present invention reduces this dielectric loss, however, by minimizing the size of the struts 72 compared to the slots 70.

Figure 5:
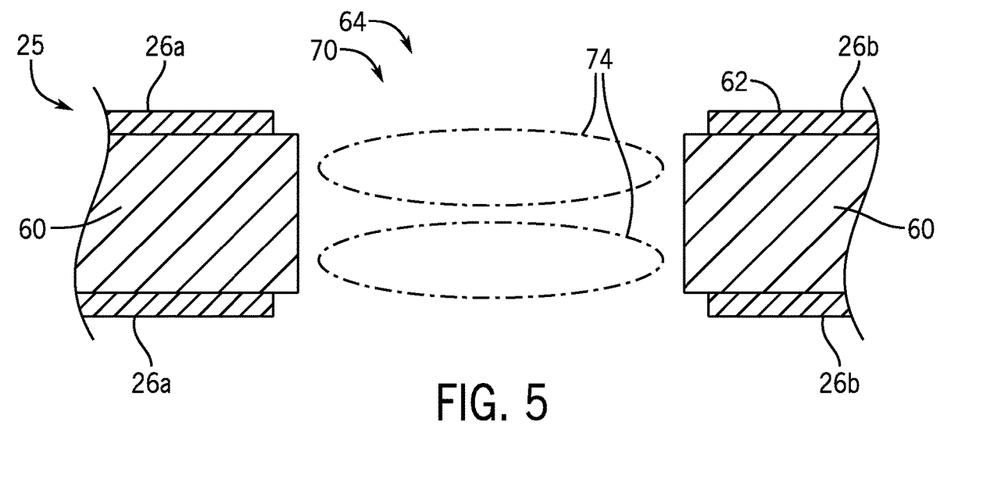
FIG. 5 is a cross-section taken along line 5-5 of FIG. 2 showing the effect of slots in reducing high field strength in dielectric regions compared to that of FIG. 3 thus reducing in dielectric loss.

In contrast, and as shown in FIG. 5, in the region of the slots 70, the dielectric material 60 is removed so that the regions of high electrical field 74 occur in extremely low dielectric regions of air (or potentially a vacuum) both approximating a dielectric constant value of 1. The slots 70 thus greatly reduce dielectric loss at high frequencies and high voltages.

Referring to FIG. 3, a similar approach is used with respect to the conductor bus 66 as it passes through the conductive capacitor plate 26b separated by gaps 68. While again regions of high field 74 occur in the dielectric material 60 between the conductor bus 66 and the conductive capacitor plate 26b, this field strength is greatly reduced over, for example, what would occur if the conductive bus were embedded in the dielectric material 60 beneath the material of the plate 26b (shown by phantom bus 66') per normal integrated circuit practice of multilayer printed circuit board manufacture. The closer proximity of the bus 66' in that case would result in higher field strengths and hence greater dielectric loss.

Figure 6:
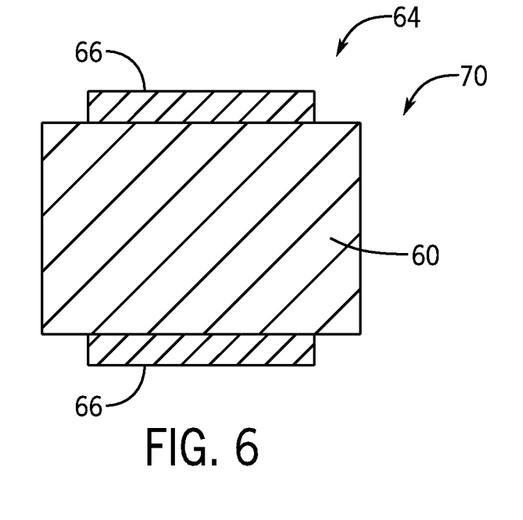
FIG. 6 is a cross-section taken along line 6-6 of FIG. 2 showing elimination of the dielectric at the point where a radial conductor passes from the outer ring to the inner ring greatly reducing dielectric loss.

Note as shown in FIG. 6, that in the gutter region 64, the bus 66 may be essentially completely isolated from capacitor plates 26a or 26b by the slots 70.

By reducing the proximity of the conductors and the presence of supporting dielectric material between conductors, the invention has provided a reduction in equivalent series resistance between the power supply and the rotor through the capacitive coupling unit 23 from approximately 6.6 ohms to approximately 1.9 ohms when operated with AC power at 2.0 MHz.

Referring again to FIG. 2 the central circuit region 71 may support rotor power processing circuitry 22, for example, providing for power rectification and impedance adjustment. This rotor power processing circuitry 22 may be assembled to the dielectric material 60 and connected by conductive traces of the same material of the capacitor plates 26a and 26b per normal printed circuit board fabrication process. The rotor power processing circuitry 22 may be generally laid out to provide a balanced rotational inertia about axis 14; however, the positioning of the rotor power processing circuitry 22 close to the center of the capacitor disk 25a and the lightweight nature of the solid-state components of such rotor power processing circuitry 22 greatly reduces accelerated forces that might unbalance the capacitor disk 25a.

Centered in the capacitor disk 25a is a circular opening 90 to allow it to receive the shaft 18 and attach to the shaft 18 by means of a collar or the like.

The central circuit region 71 holding the rotor power processing circuitry 22 may be isolated from capacitor plate 26b by a set of slots 81 and struts 82 in a gutter region 84 generally analogous to the isolation between capacitor plate 26a and 26b discussed above. This gutter region 24 is devoid of overlying conductive metal 62 except for the passage of bus 66 described above which is received by the rotor power processing circuitry 22 and a conductive tab 86 passing into the region of the rotor power processing circuitry 22 from the capacitor plate 26b. The bus 66 and tab 86 provide the conductors 24a and 24b discussed above.

The front and rear sides of the capacitor disk 25a are mirror images with respect to the layout of the metal 62 on the front and rear surfaces of the dielectric material 60 except for the rotor power processing circuitry 22 which may only be on the reverse side of the capacitor disk 25a so as to not interfere with the tight clearance from the separation distance 27 between the capacitor disks 25a and 25b shown in FIG. 7. It will be appreciated, however, that the invention is not limited to one pair of disks 25a and 25b but that multiple pairs of disks may be cascaded along the shaft 18. Further, the power processing circuitry 22 may be reduced in height (for example by direct die bonding or recesses in the printed circuit board material) so that a given capacitor disk 25a may be flanked by a pair of capacitor disks 25b and vice a versa so that both sides of the flanked disks 25 may contribute to power transfer.

The construction and front and rear sides of the capacitor disks 25b may be identical to that of capacitor disk 25a with the exception of the rotor power processing circuitry 22 which is not required and the conductive bus 66 and tab 86 which may be replaced by perpendicular conductors 21 shown in FIG. 7. Generally, the opening 90 in capacitor disk 25b will be larger than in capacitor disk 25a to allow clearance around the shaft 18 because capacitor disk 25b is stationary. The shaft 18 may pass through capacitor disk 25b to be supported by a bearing or the like for reduced play.

Desirably, the capacitance between capacitor plates 26a and 26c will be identical to the capacitance between capacitor plates 26b and 26c. This inequality is intuitively provided by ensuring that the area of each of these plates is the same under the assumption that the separation distance 27 is the same. The present inventors, however, have recognized that the effective area of the capacitor plates 26 is larger than their physical area because of fringe fields. As a result, optimally the area of metal 62 of capacitor plate 26a is desirably smaller than the area of metal 62 of capacitor plate 26b (and likewise with capacitor plates 26c and 26d) according to the equation (1):

$$A_{effective} = \pi(r_{outer}+g)^2 - \pi(r_{inner}-g)^2. \quad (1)$$

where $A_{effective}$ for capacitor plate 26a (or 26c) is set to be equal to the value of $A_{effective}$ for capacitor plate 26b (or 26d) and wherein $r_{outer}$ and $r_{inner}$ are the inner and outer radius of each ring of capacitor plate 26a (or 26c) and 26b (or 26d), respectively, adjusted for the (area of bus 66 and surrounding gaps 68), and wherein the value of g is the distance by which fringing fields extend laterally from the capacitor plates 26 such as may be determined empirically or by computer modeling.

Figure 8:
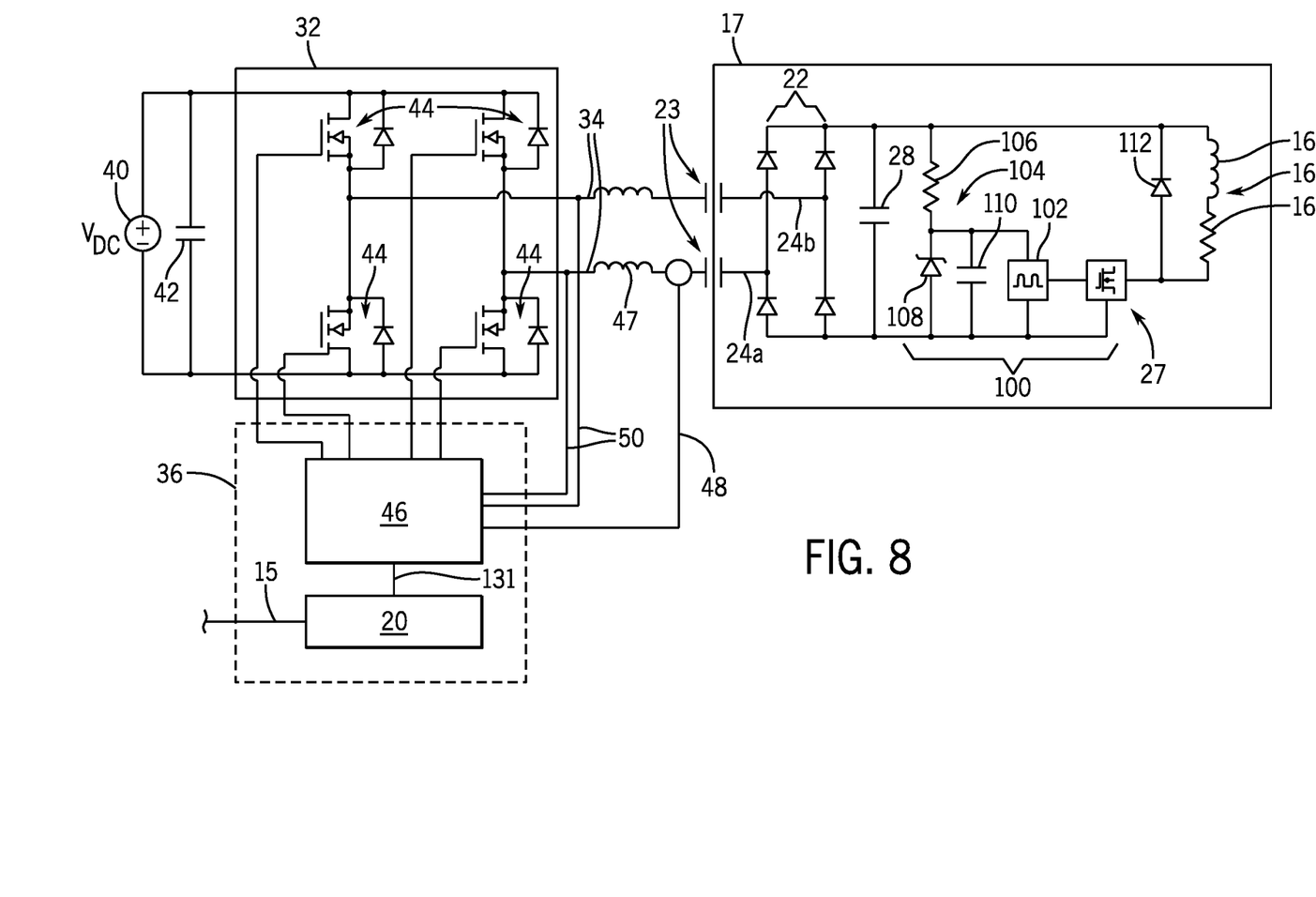
FIG. 8 is a schematic of drive electronics and rotor electronics that may be used in the present invention.

Referring now to FIG. 8, the inverter 32 used to provide power to the capacitive coupling unit 23 may comprise a standard H-bridge array of transistors 44 receiving a source of DC power 40 filtered by filter capacitor 42 and operating to switch the polarity of application of the DC power to an output providing the AC signals on lines 34. Other synthesizing circuits known in the art may also be used including half bridges, push-pull stages, etc. The fundamental frequency of the AC signal on lines 34 is desirably above 1 MHz and desirably as high as 13.56 megahertz or higher to greatly reduce the necessary capacitance of the capacitive coupling unit 23 for a given amount of transmitted power. Likewise the voltage of the AC signal on lines 34 may be in excess of 100 V and in some cases in excess of 500 V to provide transmitted powers in excess of 1 kW or in excess of 50 kW. It will be understood that the shown MOSFET transistors may be high-speed silicon carbide or gallium nitride MOSFET transistors for effective megahertz operation. Standard antiparallel diodes are provided for each transistor 44.

The gates of the switching transistors 44 are controlled by a switch logic circuitry 46 according to normal bridge switching functions and will be discussed below. The switch logic circuitry 46 may optionally receive a current signal 48 monitoring the current of the AC signals on lines 34 and a voltage signal 50 monitoring the voltage of the AC signal across lines 34. It will be understood the current sensing and voltage monitoring could be performed at a variety of other locations. For example, the current sensing could occur at the DC bus (in series with one of the lines spanned by capacitor 42), and the voltage sensing may not be required in certain circumstances or may be inferred from knowledge of the voltage of the DC bus and the switching pattern of the transistors 44.

Referring still to FIG. 8, electrical power from the AC signal on lines 34 will be transferred through the capacitive coupling unit 23 to be received by a rotor power processing circuitry 22 and from the rotor power processing circuitry 22 to the rotor coil 16. As shown, the rotor coil 16 is electrically represented by a rotor coil inductance 16' and rotor coil resistance 16".

The rotor power processing circuitry 22 may consist of four solid-state semiconductor diodes, preferably silicon carbide Schottky diodes, arranged in a full wave rectifier configuration and followed by a filter capacitor 28, as is generally understood in the art, to convert the high frequency AC signal on lines 34 to a DC voltage to power the rotor coil 16. It will be appreciated that other rectifier configurations may also be used including a halfway rectifier voltage doubler, current doubler, or voltage multiplier (Cockroft-Walton circuit).

In one embodiment, DC power from the filter capacitor 28 passes through an impedance matching circuit 100 to provide better energy transfer to the coil 16 according to the maximum power transfer theorem. In this case, the high-voltage on lines 34 preferable for power transfer through the capacitive coupling unit 23 is not well matched to the low impedance of the rotor coil 16 and impedance dictated by the use of heavy gauge copper wires in the rotor coil 16 for improved mechanical resilience and low electrical resistance. Accordingly this high-voltage after conversion to DC is reduced by the impedance matching circuit 100. This reduction in voltage and corresponding increase in current impedance may take a variety of forms making use of a matching transformer using the turn ratio between a primary and secondary coil for the conversion. Alternatively, impedance matching circuit 100 may provide a "buck converter" that "chops" the current applied to the coil 16 from the capacitor 28 at a controlled duty cycle ratio to produce an effectively lower average voltage. The buck converter, for example, may provide a square wave oscillator 102 scavenging with power from the capacitor 28 and using a lightweight power supply 104 formed by series connected resistor 106 and Zener diode 108. The resistor 106 is connected to a positive side of the DC power across capacitor 28 and the anode of the Zener diode 108 to the negative side of the DC power across capacitor 28. The junction of the resistor 106 and Zener diode 108 communicates with a secondary filter capacitor 110 which provides power to the oscillator 102. The oscillator may be a variety of designs, for example, using an integrated circuit 555 timer well known in the art. The output of the oscillator 102 provides a signal to a transistor assembly that controls current passing through the rotor coil 16 according to the duty cycle ratio of the waveform produced by the oscillator 102. By reducing the duty cycle ratio, the average voltage across the rotor coil 16 is reduced while additional current can be drawn from the capacitor 28. A flyback diode 112 is provided across the coil 16 to commutate the current resulting from the switching operation.

As noted, rotor power processing circuitry 22 and the impedance matching circuit 100 may be attached to the capacitor disk 25a discussed above or may be attached elsewhere on the rotor 17.

Referring still to FIG. 8, inductors 47 may be placed in series with the capacitor plates 26c and 26d to receive current from the inverter 32. These inductors 47, in series with the series capacitances of the capacitive coupling unit 23, present a series resonance at which the impedance to current flow from the inverter 32 through the rotor coil 16 is minimized. The switch logic circuitry 46 of the inverter 32 may accordingly be set so that the fundamental frequency of the AC signal on lines 34 is at the series resonance frequency in order to maximize energy transfer to the rotor coil 16 from the low output impedance inverter 32 and to permit desirable soft switching of the transistors 44.

Figure 9:
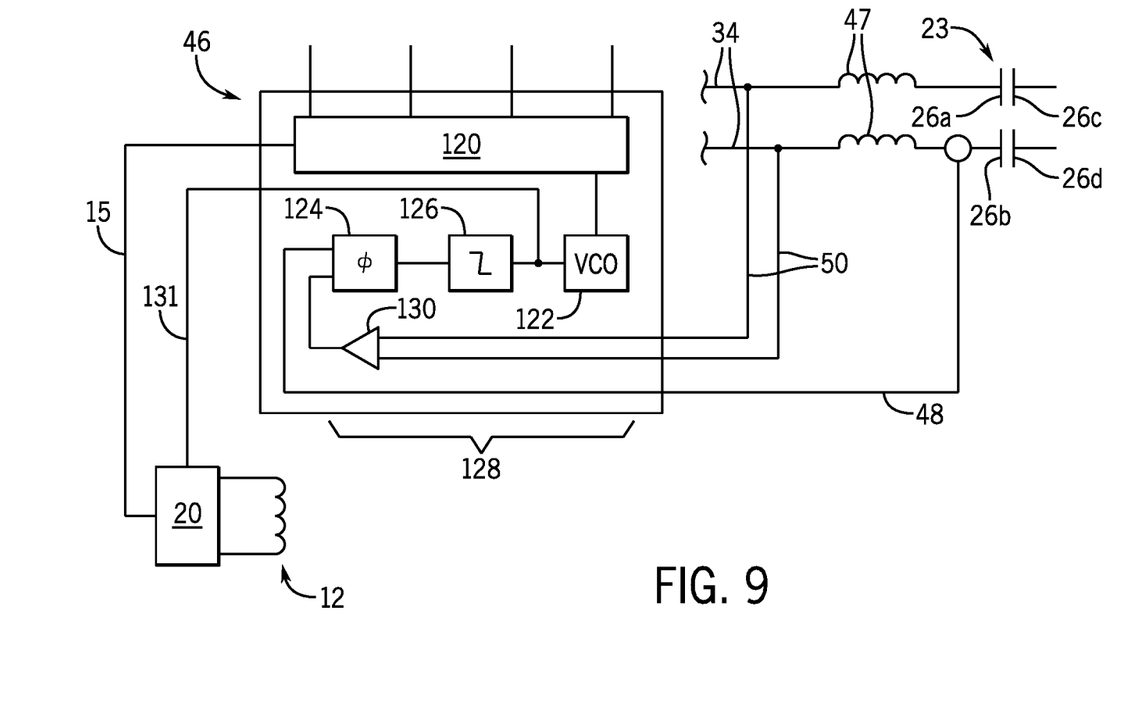
FIG. 9 is a detailed diagram of a portion of the drive electronics employing a phase locked loop for improved power transfer.

Referring now to FIG. 9, the switch logic circuitry 46, which provides switch state circuitry 120 that correctly sequences the control signals to the MOSFET transistors 44, may be controlled in switching frequency by a voltage controlled oscillator 122 being part of a phase locked loop 128. The voltage controlled oscillator 122 receives a signal from a low-pass filter 126 that in turn receives the output of a phase comparator 124, this output dependent on a phase error between the inputs of the phase comparator 124. A first input to the phase comparator 124 is current signal 48 and the second input to the phase comparator 124 is a voltage signal 50 taken across lines 34 and extracted by differential amplifier 130. Alternatively, the second input to the phase comparator 124 may be taken directly from the output of the voltage controlled oscillator 122 (see FIG. 9) to avoid the need to connect to high voltages of lines 34.

The error output from the phase comparator 124 serves to change the frequency of the voltage controlled oscillator 122 so that the phase of the current and voltage become matched, a state consistent with operation of the frequency of the AC power on lines 34 at the natural resonant frequency of the series connected capacitances and inductors 47. In this way, maximum power is transferred and soft switching of the transistors 44 may occur such as reduces transistor heating and energy loss. A phase locked loop circuit suitable for use with present invention can be realized by the widely available CMOS 4046 phase locked loop monitoring the phases of current and voltage using zero crossing detector circuitry.

Figure 10:
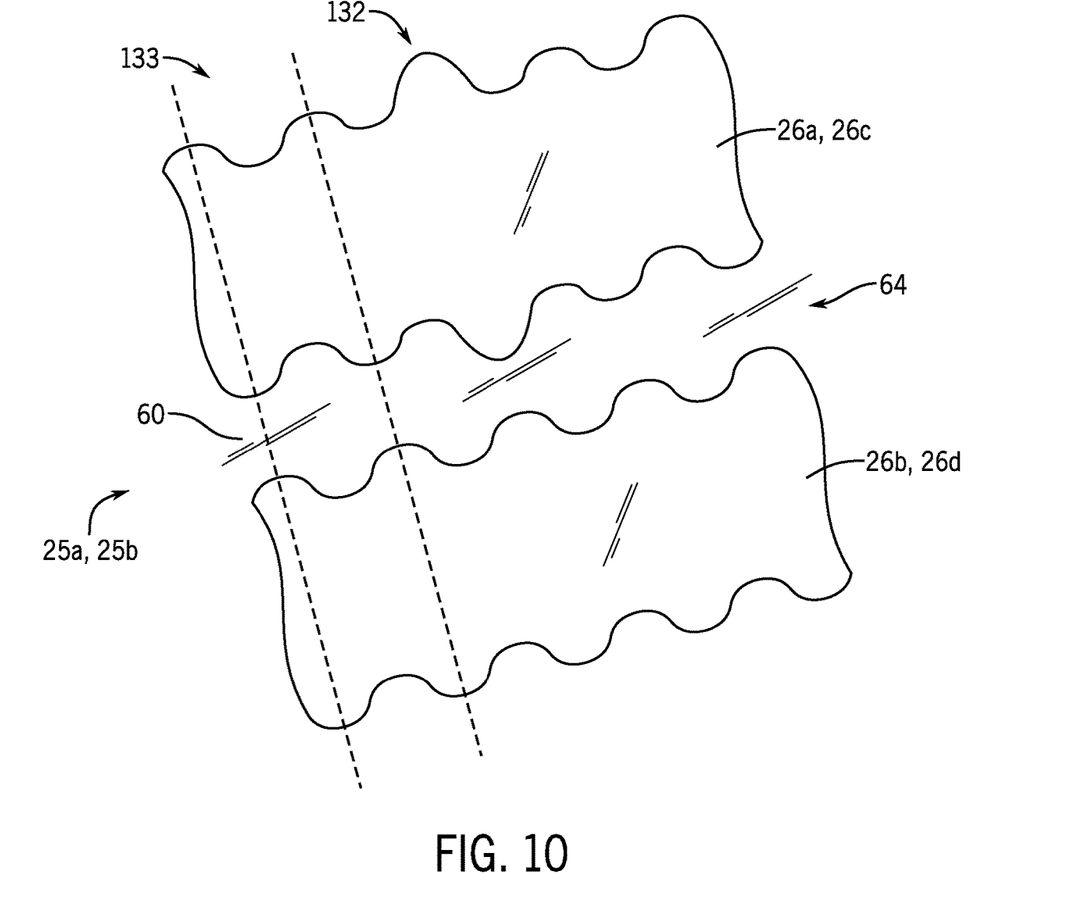
FIG. 10 is a fragmentary side view of the annular capacitor rings scalloped to provide a regular position signal through capacitive coupling.

The output 131 of the low-pass filter 126, such as indicates a phase error and reflects the frequency of operation of the VCO in tracking the natural resonance frequency, will have perturbations caused by minor changes in capacitive coupling in the capacitive coupling unit 23 as the rotor 17 rotates. These changes, for example, may reflect slight variation in the separation between the capacitor disks 25 from lack of perfect alignment or may be intentionally imposed, for example, as shown in FIG. 10 by adding scalloping 133 to the inner or outer diameters of the capacitor plates 26 causing regular capacitance fluctuations as these scallops rotate into and out of alignment. Desirably the scalloping 133 will be on a regular angular basis for both capacitor plates 26a and 26b and for both of the capacitor disks 25a and 25b to accentuate this perturbation for improved measurement. By measuring the perturbation, changes in rotational position and velocity of the rotor 17 may be determined without the need for a separate resolver or encoder. Direction may be obtained through the use of an additional set of plates 26 (for example concentric and outside of plates 26a-26d) that provide a signal that is 90° out of phase with the signals provided by plates 26a-26d. These auxiliary plates need not participate in power transfer and would therefore not need to be connected to the inverter 32 but would need access to a separate excitation signal (see below) for capacitance measurement. The 900 signal allows direction to be determined by simply looking at the relative phase of the two signals.

The scalloping may also be modified, for example, with a variation in one of the capacitor plates 26*a* and/or 26*b* (and in corresponding capacitor plates 26*c* and/or 26*d*) at a designated absolute angular position to provide increased or decreased capacitance outside of the normal scalloping 133 to create an absolute rotor position reference detectable, for example, by a local capacitive peak or trough outside of the capacitance amplitude excursions of the normal scalloping 133.

The output 131 may thus provide both a position signal of the rotor and a velocity of the rotor such as can be provided to a stator winding control unit 20 to control, for example, the voltage applied to the capacitive coupling unit 23, for example, by burst modulation to change the field winding currents to control motor speed range by field weakening. Burst modulation controls the gating of the transistors 44 "on" for a predetermined number of cycles, and then "off" for a predetermined number of cycles to control average field current. The energy storage property of the field winding inductance smoothes the output current, provided that the repetition rate of the burst modulation is fast enough.

The same burst modulation can be used to sense rotor position to the extent that it effectively modulating the rotor current by the burst repetition rate which can be much lower than the normal rate of transistor switching during the burst. This low frequency burst modulation rate can then act like a signal injection to perform rotor position or velocity measurements through burst frequency content in the stator's back EMF in the manner of current injection systems.

Referring again to FIG. 8, it will also be appreciated that the buck converter 100 may be operated at a frequency so that the perturbations in current through the coil 16 caused by the buck converter are not fully filtered by the inductance of the coil 16 but create a measurable flux variation at the stator windings 12. These flux variations can be detected by the stator winding control unit 20 and used to detect the rotational speed and position of the rotor 17, again according to well understood current injection sensing techniques, albeit, operating from the rotor to the stator. More specifically, the stator winding control unit 20 may include a demodulator detecting a ripple in the amplitude of the flux from the buck converter which will have a rotor 17 position dependent presence in the stator 12 back EMF. This information may be used for speed and position control of the motor 10.

It will be appreciated that the above-described principles and apparatus may also be used with respect to a wound field synchronous machine 10 configured as a generator in which a magnetic field is established on a rotor coil 16 through a rotor power processing circuitry 22 which receives an AC signal on lines 34 through first coupler capacitor disk 25 from drive electronics 30. In this case, the stator windings 12 may be attached to drive a load.

The invention contemplates that the drive electronics 30 may be placed directly on the plate 25*b* for example at an analogous location to the central circuit region 71 of the plate 25*a*. In this case, the perpendicular conductors 21 may be replaced with bus conductor 66 and tab 86 to allow communication between the drive electronics 30 and the inner and outer plates 26*c* and 26*d*.

It will further be appreciated that additional sets of capacitor plates 26 may be added for three-phase or multiphase operation.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:
1. An electrical rotating machine comprising:
   a rotor mounted for rotation about an axis and including at least one electrical coil having a coil axis with a magnetic field component perpendicular to the axis when the electrical coil is energized with an electric current, the electrical coil comprising a conductor having first and second conductor ends;

at least a first and second capacitor plate, attached to rotate with the rotor and electrically communicating with the electrical coil; and at least a third and fourth capacitor plate, mounted to a frame so as not to rotate with the rotor and positioned for capacitive coupling with the first and second capacitor plates respectively to transfer power between the electrical coil and an external source of power at a range of angular positions of the rotor about the axis;

wherein the first and second capacitor plates are nonoverlapping in directions parallel to the axis and supported by an insulating dielectric extending perpendicularly to the axis wherein the insulating dielectric includes axial through slots separating the first and second capacitor plates.

2. The electrical rotating machine of claim 1 wherein the first and second capacitor plates follow concentric circular paths on the insulating dielectric and the slots are arcuate slots between the first and second capacitor plates separated by supporting struts.

3. The electrical rotating machine of claim 2 wherein an area of the capacitor plate having an outer circular path is smaller than an area of the capacitor plate on an inner circular path inside the outer circular path.

4. The electrical rotating machine of claim 2 wherein the insulating dielectric supports power processing circuitry at a central region radially within the first and second capacitor plates and including a radially extending conductor passing from an outermost capacitor plate to the central region within a gap in an innermost conductor plate.

5. The electrical rotating machine of claim 4 wherein the power processing circuitry includes rectification circuitry.

6. The electrical rotating machine of claim 1 further including an impedance matching circuit attached to rotate with the rotor and electrically communicating with the electrical coil, the impedance matching circuit positioned in the circuit through the first and second capacitor plates and the electrical coil, and operating to reduce voltage and increase current to the electrical coil from that applied at the first and second capacitor plates.

7. The electrical rotating machine of claim 6 wherein the impedance matching circuit is a buck converter.

8. The electrical rotating machine of claim 7 wherein the buck converter provides a switching of current through the electrical coil at a predetermined frequency of less than 1 MHz and less than 90% duty cycle ratio.

9. The electrical rotating machine of claim 7 wherein the buck converter provides active circuitry powered by electrical power received through the capacitor plates.

10. The electrical rotating machine of claim 1 wherein the first and second capacitor plates are separated by more than 0.1 mm from respective of the third and fourth capacitor plates measured along the axis.

11. The electrical rotating machine of claim 1 wherein the insulating dielectric is a fiber-reinforced composite material having a dielectric constant of less than five.

12. The electrical rotating machine of claim 1 wherein the insulating dielectric material provides a front and rear face opposed along the axis and provides metallic cladding covering more than 50% of an area of each face.

13. The electrical rotating machine of claim 1 further including a solid-state power converter substantially fixed with respect to the frame so as not to rotate with the rotor and communicating with the third and fourth capacitor plates to provide alternating current power to at least one electrical coil synthesized from a DC source, the alternating current power having a frequency greater than 1 MHz, and a power of at least 5 W.

14. The electrical rotating machine of claim 13 wherein the solid-state power converter includes a phase locked loop controlling a phase of current through the capacitor plates with respect to a phase of the voltage applied to the capacitor plates to provide alternating current power at a resonant frequency of capacitances formed by the capacitor plates and inductance attached thereto.

15. The electrical rotating machine of claim 14 wherein the solid-state power converter provides for control of the electrical rotating machine according to a change in frequency of the phase locked loop.

16. The electrical rotating machine of claim 1 wherein the third and fourth capacitor plates are nonoverlapping in directions parallel to the axis and supported by a second insulating dielectric, extending perpendicularly to the axis Wherein the second insulating dielectric includes axial through slots separating the third and fourth capacitor plates and wherein the third and fourth capacitor plates follow concentric circular paths on the second dielectric and the slots are arcuate slots between the first and second capacitor plates separated by supporting struts.

17. An electrical rotating machine comprising:
a rotor mounted for rotation about an axis and including at least one electrical coil having a coil axis with a magnetic field component perpendicular to the axis when the electrical coil is energized with an electric current, the electrical coil comprising a conductor having first and second conductor ends;

at least a first and second capacitor plate, attached to rotate with the rotor and electrically communicating with the rotor; and at least a third and fourth capacitor plate, mounted to a frame so as not to rotate with the rotor and positioned for capacitive coupling with the first and second capacitor plates, respectively, to transfer power between the electrical coil and an external source of power at a range of angular positions of the rotor about the axis;

further including an impedance matching circuit attached to rotate with the rotor and electrically communicating with the electrical coil, the impedance matching circuit positioned in an electrical circuit through the first and second capacitor plates and the electrical coil reducing voltage and increasing current from that applied at the first and second capacitor plates to that applied at the electrical coil.

18. The electrical rotating machine of claim 17 wherein the impedance matching circuit is a buck converter.

* * * * *